United States Patent [19]
Kanazawa

[11] Patent Number: 5,806,918
[45] Date of Patent: Sep. 15, 1998

[54] VEHICLE BODY STRUCTURE

[75] Inventor: Yoshinobu Kanazawa, Saitama-ken, Japan

[73] Assignee: Honda Giken Kogyo Kabushiki Kaisha, Tokyo, Japan

[21] Appl. No.: 705,092

[22] Filed: Aug. 29, 1996

[30] Foreign Application Priority Data

Sep. 1, 1995 [JP] Japan .................................. 7-248736

[51] Int. Cl.⁶ .................................................. B62D 21/15
[52] U.S. Cl. ............................ 296/204; 296/30; 296/188
[58] Field of Search .................................... 296/188, 189, 296/194, 203, 204, 209, 30

[56] References Cited

U.S. PATENT DOCUMENTS

| | | | |
|---|---|---|---|
| 3,202,451 | 8/1965 | Auger et al. | 296/204 |
| 3,419,303 | 12/1968 | Eggert, Jr. et al. | 296/204 |
| 4,514,008 | 4/1985 | Watanabe et al. | 296/204 |
| 4,898,419 | 2/1990 | Kenmochi et al. | 296/204 |
| 5,002,333 | 3/1991 | Kenmochi et al. | 296/204 |
| 5,125,715 | 6/1992 | Kijima | 296/189 |
| 5,370,438 | 12/1994 | Mori et al. | 296/209 |

*Primary Examiner*—Dean Kramer
*Attorney, Agent, or Firm*—Armstrong, Westerman, Hattori, McLeland & Naughton

[57] ABSTRACT

A vehicle body structure includes a pair of floor frames, a pair of auxiliary frames, and a pair of side sills disposed in juxtaposition about a longitudinal central axis of a vehicle body and arranged in the order named in a transversely outward direction of the vehicle body wherein the auxiliary frames have front ends spaced rearwardly, by a predetermined distance, from rear end portions of a pair of side outriggers. A front portion of the vehicle body located forwardly of the front ends of the auxiliary frames has less rigidity than a rear portion located rearwardly of the rear ends of the auxiliary frames. The vehicle body structure thus constructed can effectively absorb the energy of a crush or collision while maintaining a certain degree of rigidity. The side sills are each composed of a box-shaped hollow member containing therein an elongated reinforcing member. The reinforcing member has a front end substantially aligned with the front ends of the auxiliary frames in the transverse direction of the vehicle body so that the rear section of the vehicle body located rearwardly of the front ends of the auxiliary frames has an increased degree of rigidity.

6 Claims, 6 Drawing Sheets

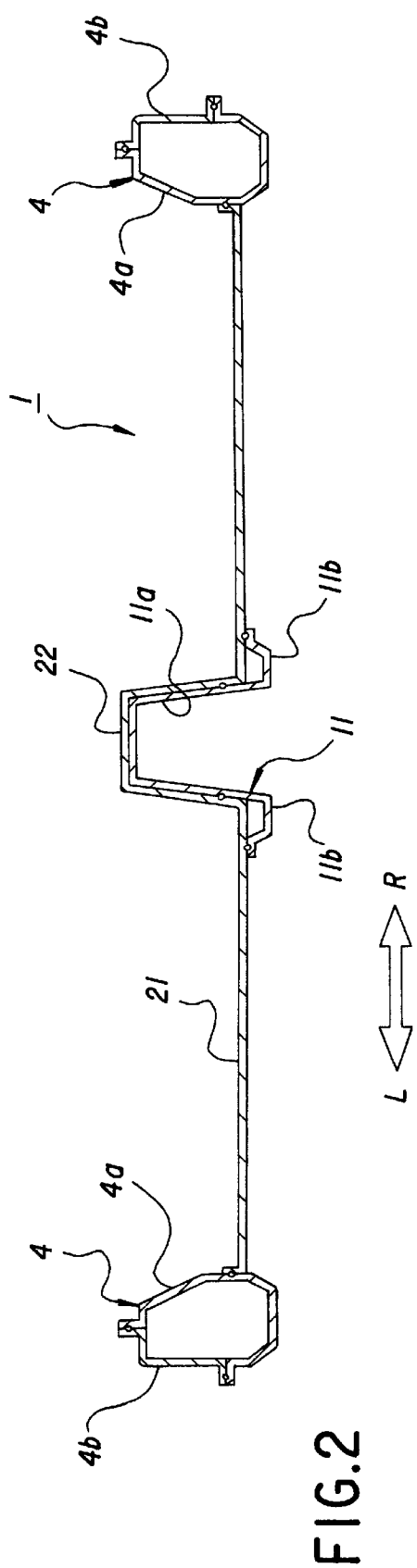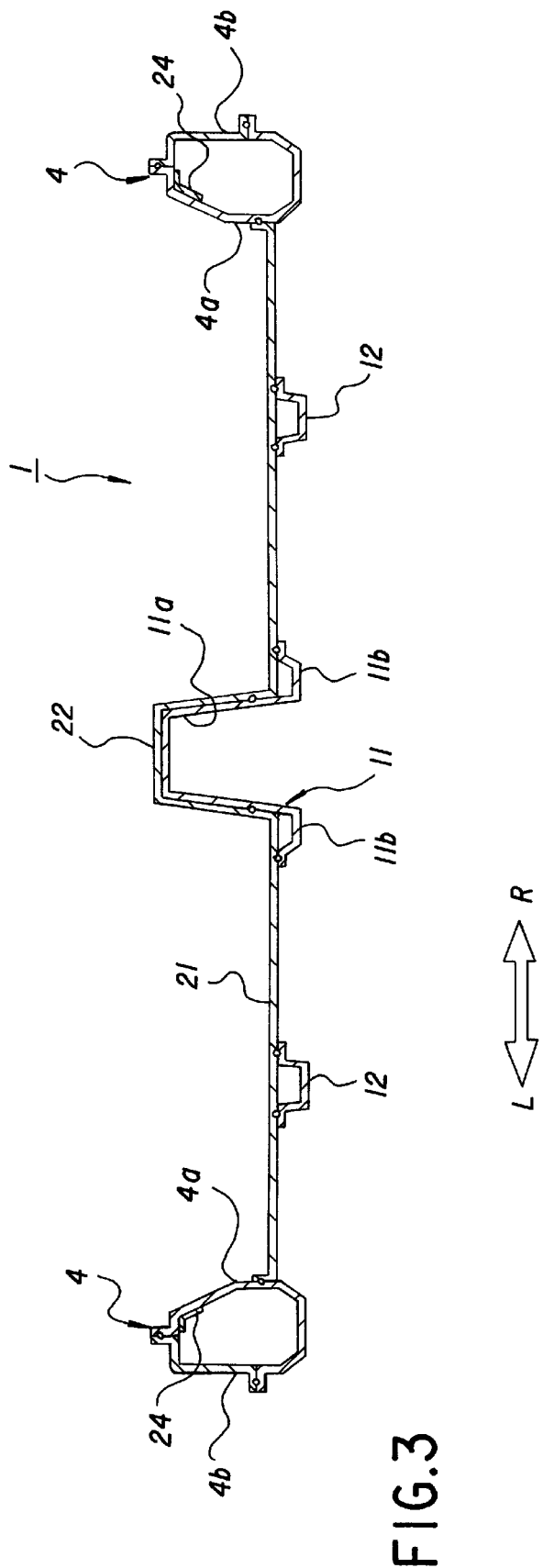

VEHICLE BODY STRUCTURE

BACKGROUND OF THE INVENTION

1. Field of the Invention

The present invention relates generally to a body structure for vehicles, and more particularly to a vehicle body structure having a front section designed to effectively absorb the energy of a crash as well as to provide a certain degree of rigidity.

2. Description of the Related Art

A conventional vehicle body structure is shown in FIGS. 8A and 8B hereof for the purpose of explanation. FIG. 8A shows in plan a front section of the vehicle body structure, and FIG. 8B is a perspective view of the front section of the same vehicle body structure.

The vehicle body 100 generally comprises first floor frames 101, 101, second floor frames 102, 102, and side sills 103, 103 each provided in a pair about a longitudinal central axis of the vehicle body and arranged in a transverse outward direction of the vehicle body in the order named. Front ends of the first and second floor frames 101, 101 and 102, 102 and front ends of the side sills 103, 103 are connected via left and right side outriggers 104, 104 to rear ends of left and right front side frames 105, 105. A bumper beam 106 is attached to front ends of the front side frame 105, 105.

The vehicle body 100, as shown in FIG. 8B, further includes a floor panel 107 extending between the left and right side sills 103, 103 such that the floor panel 107 is reinforced by the aforesaid left and right first floor frames 101, 101 and the aforesaid left and right second floor frames 102, 102. A floor tunnel frame 108 formed along the longitudinal central axis of the vehicle body.

With the vehicle body 100 thus constructed, collision forces or energy acting on the bumper beam is absorbed to a certain amount by the left and right front side frames 105, 105 as they undergo a plastic deformation, the rest of the collision energy being absorbed by the front section (i.e., the first floor frames 101, the second floor frames 102 and the side sills 103) of the vehicle body. It is, therefore, required for the front body section to effectively absorb the collision energy while maintaining a certain degree of rigidity.

SUMMARY OF THE INVENTION

It is accordingly an object of the present invention to provide a vehicle body structure including a front body section which is capable of effectively absorbing the energy of a crush while maintaining a certain degree of rigidity.

To attain the foregoing object, a vehicle body structure of this invention includes a pair of floor frames, a pair of auxiliary frames, and a pair of side sills disposed in juxtaposition about a longitudinal central axis of a vehicle body and arranged in the order named in a direction transversely and outwardly of the vehicle body wherein the auxiliary frames have front ends spaced rearwardly, by a predetermined distance, from rear end portions of a pair of side outriggers by means of which the floor frames and the side sills are connected to left and right front side frames.

With this vehicle body structure, a front section of the vehicle body which is located forwardly of the front ends of the auxiliary frames has a smaller rigidity than a rear section of the vehicle body located rearwardly of the front ends of the auxiliary frames. In the case of a crush, collision forces or energy acting on the front side frames is transmitted via the side outriggers to the floor frames and the side sills. During that time, the floor frames and side sills undergo a plastic deformation, thus effectively absorbing the energy of collision. When the side outriggers are forcibly displaced rearwardly by the predetermined distance by the energy of collision, they come into abutment with the front ends of the auxiliary frames. In this instance, the auxiliary frames bear or sustain the collision forces in cooperation with the floor frames and the side sills, so that the front section of the vehicle body can retain a certain degree of rigidity. Thus, the vehicle body structure of the invention can effectively absorb the energy of a crush or collision while maintaining a certain degree of rigidity of the front section of the vehicle body.

The side sills are each composed of a box-shaped follow member containing therein an elongated reinforcing member. The reinforcing member has a front end substantially aligned with the front ends of the auxiliary frames in the transverse direction of the vehicle body so that the rear section of the vehicle body located rearwardly of the front ends of the auxiliary frames has an increased degree of rigidity.

The above and other objects, features and advantages of the present invention will become manifest to those versed in the art upon making reference to the detailed description and accompanying sheets of drawings in which preferred structural embodiments incorporating the principles of the present invention are shown by way of illustrative example.

BRIEF DESCRIPTION OF THE DRAWINGS

FIG. 2 is an enlarged cross-sectional view taken along line II—II of FIG. 1;

FIG. 3 is an enlarged cross-sectional view taken along line III—III of FIG. 1;

DETAILED DESCRIPTION OF THE PREFERRED EMBODIMENTS

Figure 1:
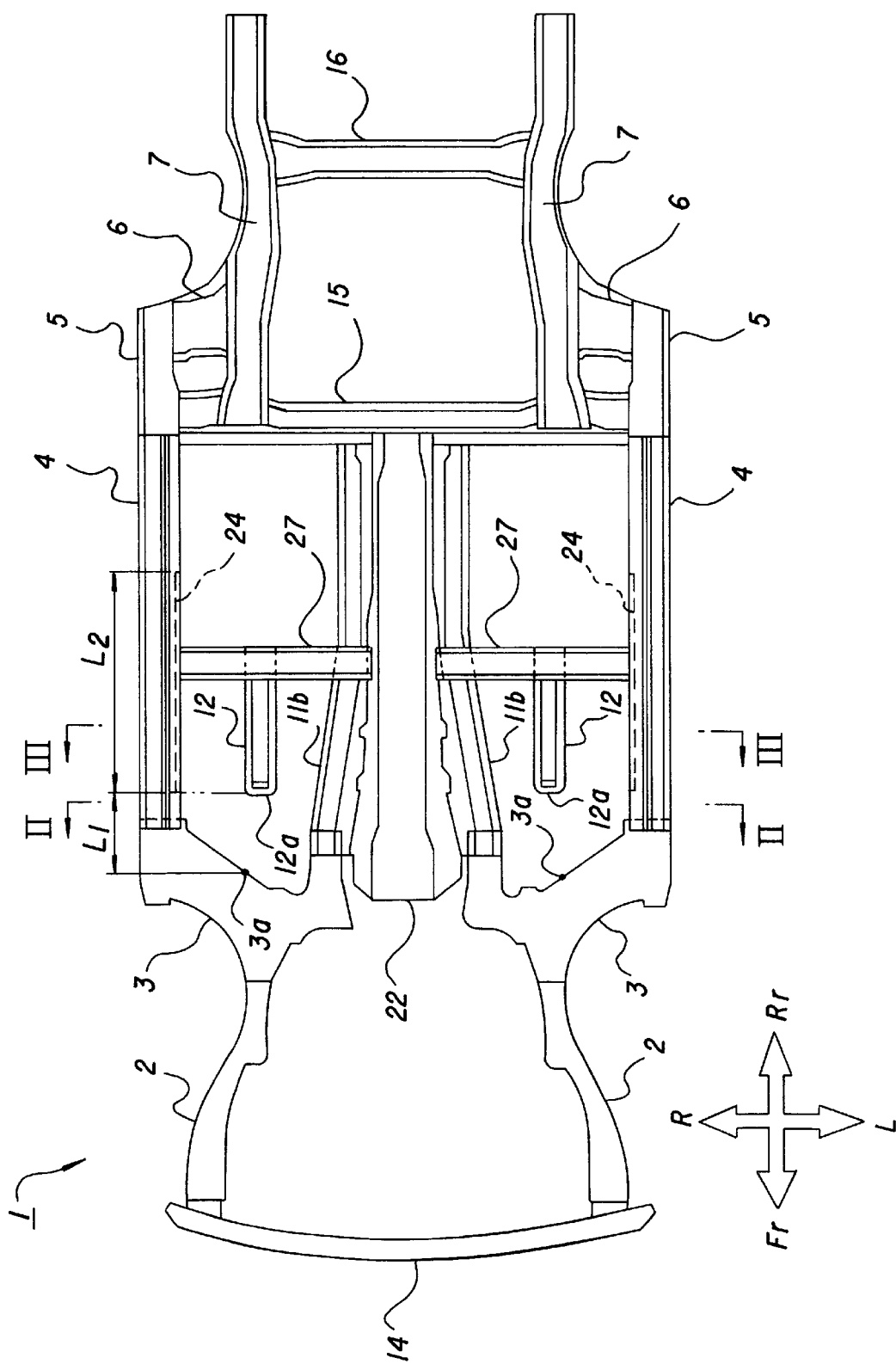
FIG. 1 is a plan view showing a first embodiment of a vehicle body structure according to the present invention.

Throughout the specification, the terms "front", "rear", "left", "right", "upper", and "lower" are used with reference to the geometric center of a vehicle body to which the present invention pertains. Reference characters Fr, Rr, L, and R appearing with arrowheads shown in the drawing figures indicate the front, rear, left, and right sides, respectively, of the vehicle body.

FIGS. 1 through 4 shows a first embodiment of a vehicle body structure according to the present invention. In FIG. 1 a floor panel is omitted for purposes of illustration.

As shown in FIG. 1, a vehicle body 1 essentially comprises left and right front side frames 2, 2 extending longitudinally of the vehicle body 1 along opposite sides of a front portion of the vehicle body 1, left and right side outriggers 3, 3 joined at their front ends to the respective rear ends of the front side frames 2, 2, left and right side sills 4, 4 joined at their front ends to the respective rear ends of the side outriggers 3, 3, left and right side sill extensions 5, 5 joined at their front ends to the respective rear ends of the side sills, and left and right rear side frames 7, 7 connected to the respective rear ends of the side sill extensions 5, 5 via left and right connecting members 6, 6.

The vehicle body 1 further includes left and right floor frames 11b, 11b, and left and right auxiliary frames 12, 12 that are disposed in juxtaposition together with the side sills 4, 4 about a longitudinal central axis of the vehicle body 1 and arranged in the order named in a direction transversely and outwardly of the vehicle body 1. Front ends of the floor frames 11b, 11b and front ends of the side sills 4, 4 are connected to the rear ends of the front side frames 2, 2 via the side outriggers 3, 3 that have a substantially Y-shaped configuration. The auxiliary frames 12, 12 have front ends 12a, 12a spaced rearwardly by a predetermined distance $L_1$ from rear end portions 3a, 3a of the side outriggers 3, 3 (that are located directly below a dashboard, not shown, for example, of the vehicle body 1).

A bumper beam 14 is attached to the front ends of the front side frames 2, 2. Reference characters 15 and 16 denote a middle crossbar and a rear crossbar, respectively. The floor frames 11b, 11b are joined at their rear ends to the middle crossbar 15.

As shown in FIG. 2, the vehicle body 1 also includes a floor panel 21 extending between the left and right side sills 4, 4. The floor panel 21 has an integral floor tunnel frame 22 extending along the longitudinal central axis of the vehicle body. The floor tunnel frame 22 has a downwardly opening recessed portion reinforced from the inside thereof by a floor center frame 11.

The side sills 4, 4 are each composed of a box-shaped hollow member formed jointly by a side sill inner 4a and a side sill outer 4b.

The floor center frame 11 has a generally hat-shaped transverse cross section and includes a downwardly opening, substantially inverted U-shaped center frame 11a fitted with an inside surface of the recessed portion of the floor tunnel frame 22, and the aforesaid left and right floor frames 11b, 11b of an upwardly opening generally channel-shaped cross section contiguous to and formed integrally with opposite open ends of the U-shaped center frame 11a. The left and right floor frames 11b, 11b reinforce the underside of the floor panel 21.

As shown in FIG. 3, the floor panel 21 is further provided with an additional reinforcing member which is composed of the aforesaid left and right auxiliary frames 12, 12. The auxiliary frames 12, 12 have an inverted hat-shaped transverse cross section.

The box-shaped side sills 4, 4 each include a first side sill reinforcing member 24 disposed therein and extending along a longitudinal portion of the side sill 4. The reinforcing member 24 has a substantially L-shaped cross section and is attached to one upper interior corner of the box-shaped side sill 4 which is located closer to the longitudinal central axis of the vehicle body 1 than the other upper interior corner.

Referring back to FIG. 1, there are provided two transversely aligned floor cross frames 27, 27 each extending between the floor tunnel frame 22 and one of the side sills 4, 4 to reinforce the upper side of the floor panel 21 (FIG. 2). The auxiliary frames 12 have rear ends directed directly below the floor cross frames 27, 27 which are disposed substantially at a longitudinal central portion of the vehicle body 1.

The side sill reinforcing member 24 has a front end substantially aligned with the front ends 12a of the auxiliary frames 12 in the transverse direction of the vehicle body 1. The reinforcing member 24 has a length $L_2$ such that the rear end of the reinforcing member 24 is located substantially below a center pillar, not shown, of the vehicle body 1.

Figure 4:
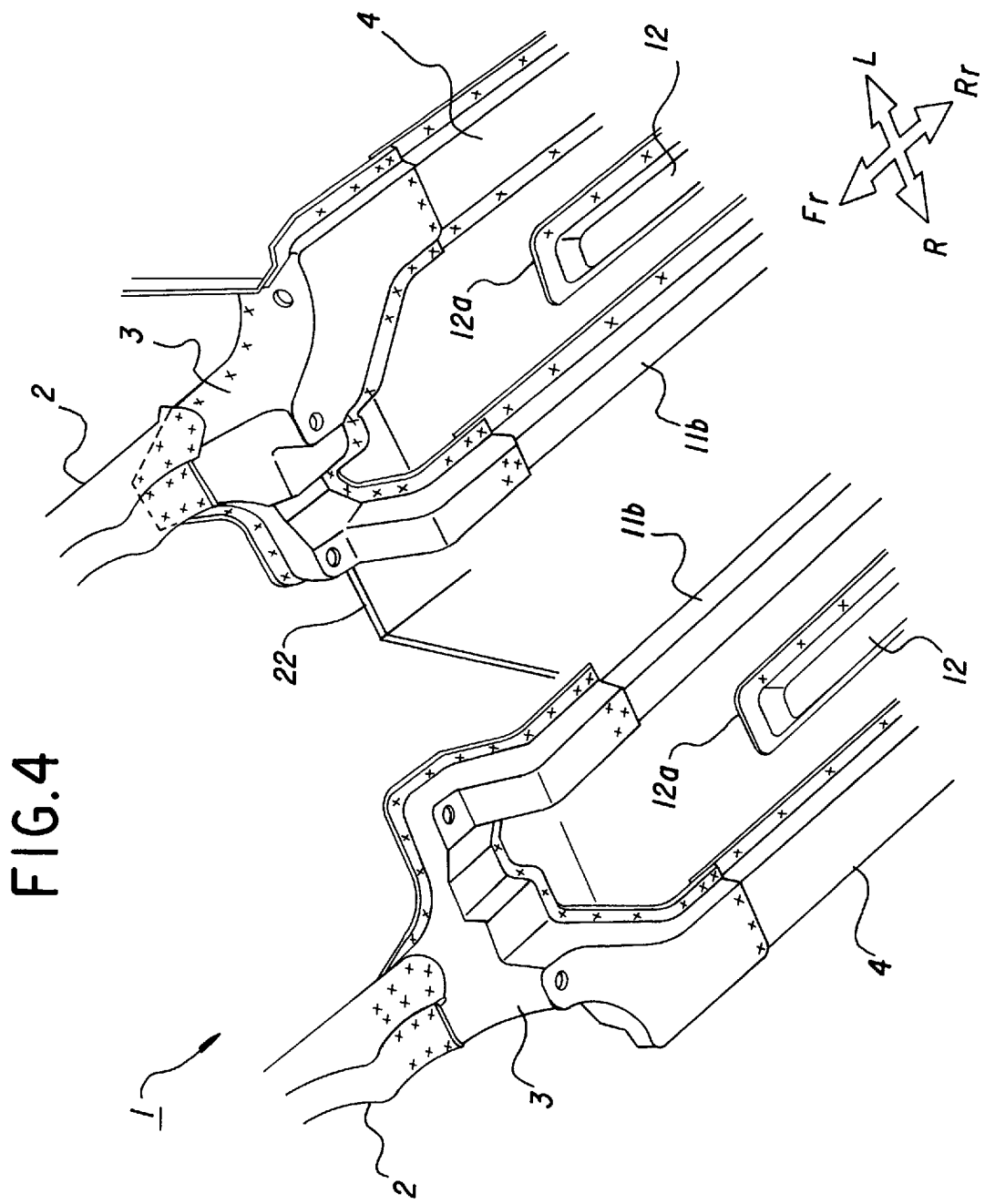
FIG. 4 is a perspective view of a front section of the vehicle body according to the first embodiment.

As shown in FIG. 4, the front ends 12a, 12a of the auxiliary frames 12, 12 are closed and structurally separated from the side outriggers 3, 3, by the spacing of the predetermined distance $L_1$ defined between the front ends 12a, 12a and the side outriggers 3, 3. The closed front ends 12a, 12a are preferably formed as sloped end faces to facilitate the production of the auxiliary frames 12.

Operation of the vehicle body structure of the foregoing construction will be described below with reference to FIG. 1.

Since the front ends 12a, 12a of the auxiliary frames 12, 12 are spaced rearwardly from the rear end portions 3a, 3a of the side outriggers 3, 3 by the predetermined distance $L_1$, a front section of the vehicle body 1 is divided, in terms of rigidity, into two parts by the front ends 12a, 12a. That is, a front section of the vehicle body 1 located forwardly of the front ends 12a, 12a has less rigidity than a rear section of the vehicle body 1 located rearwardly of the front ends 12a, 12b.

In the case of a crush, collision forces or energy acting on the bumper beam 14 is absorbed up to a predetermined amount by the bumper beam 14 and the floor side frames 2, 2 as they undergo a plastic deformation. The remaining collision energy acts via the side outriggers 3, 3 onto the side sills 4, 4 and floor frames 11b, 11b, then is effectively absorbed by the side outriggers 3, 3, the side sills 4, 4 and the floor frames 11b, 11b as they undergo a plastic deformation.

When the side outriggers 3, 3 are forcibly displaced by the energy of collision in the rearward direction by the predetermined distance $L_1$, the rear end portions 3a, 3a come into abutment with the front ends 12a, 12a of the auxiliary frames 12, 12. Thereafter, the still remaining energy of collision is born jointly by the side outriggers 3, 3, the side sills 4, 4, the floor frames 11b, 11b and the auxiliary frames 12, 12. Thus, the collision energy is effectively absorbed by the overall structure of the vehicle body 1.

In this instance, since the front ends of the side sill reinforcing members 24, 24 are substantially disposed in transverse alignment with the front ends 12a, 12a of the auxiliary frames 12, 12, the rigidity of the rear section of the vehicle body 1, which is located rearwardly of the front ends 12a, 12a, is further increased by the reinforcing members 24, 24.

Figure 5:
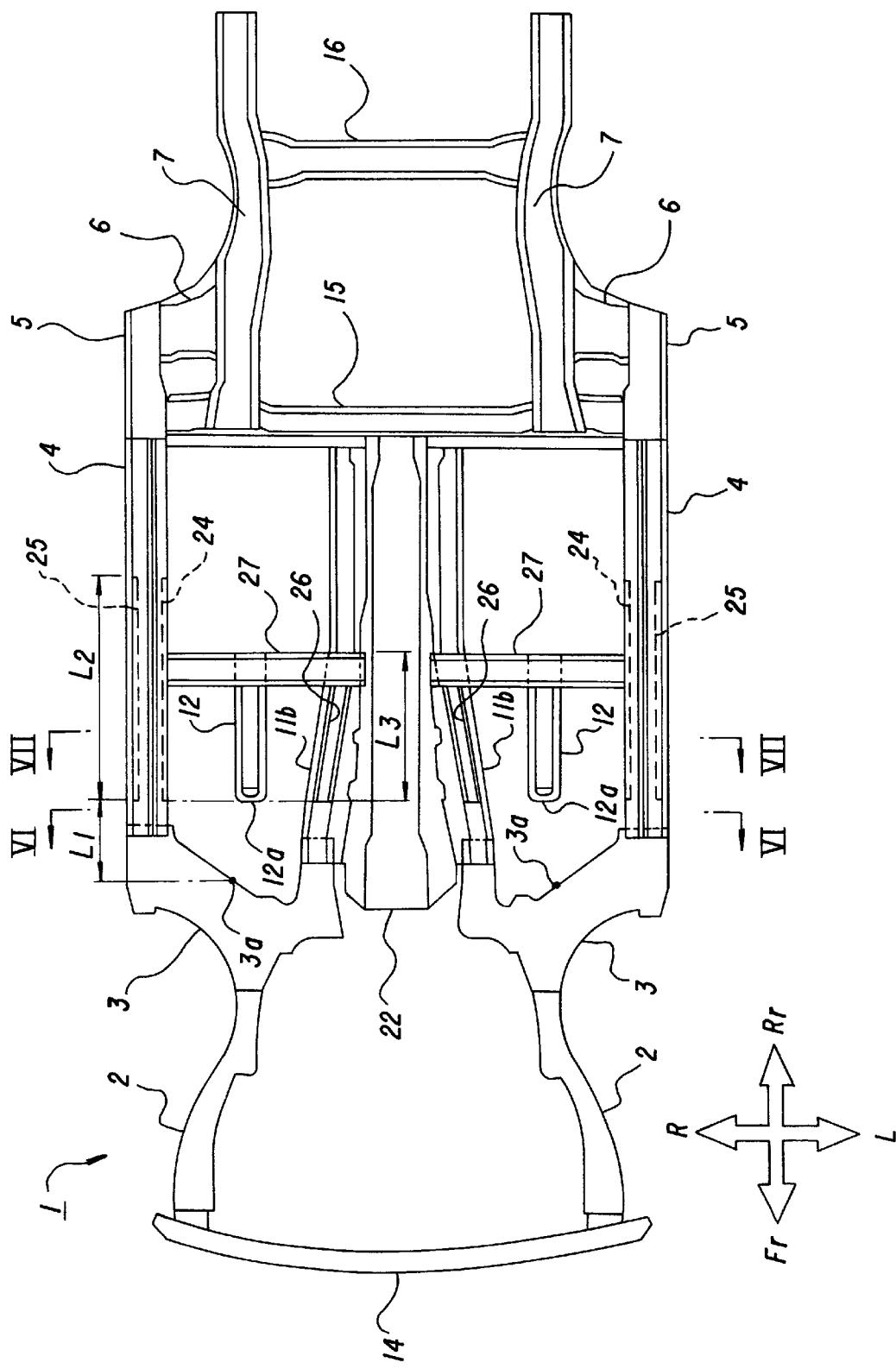
FIG. 5 is a plan view showing a second embodiment of a vehicle body structure according to the present invention.
Figure 6:
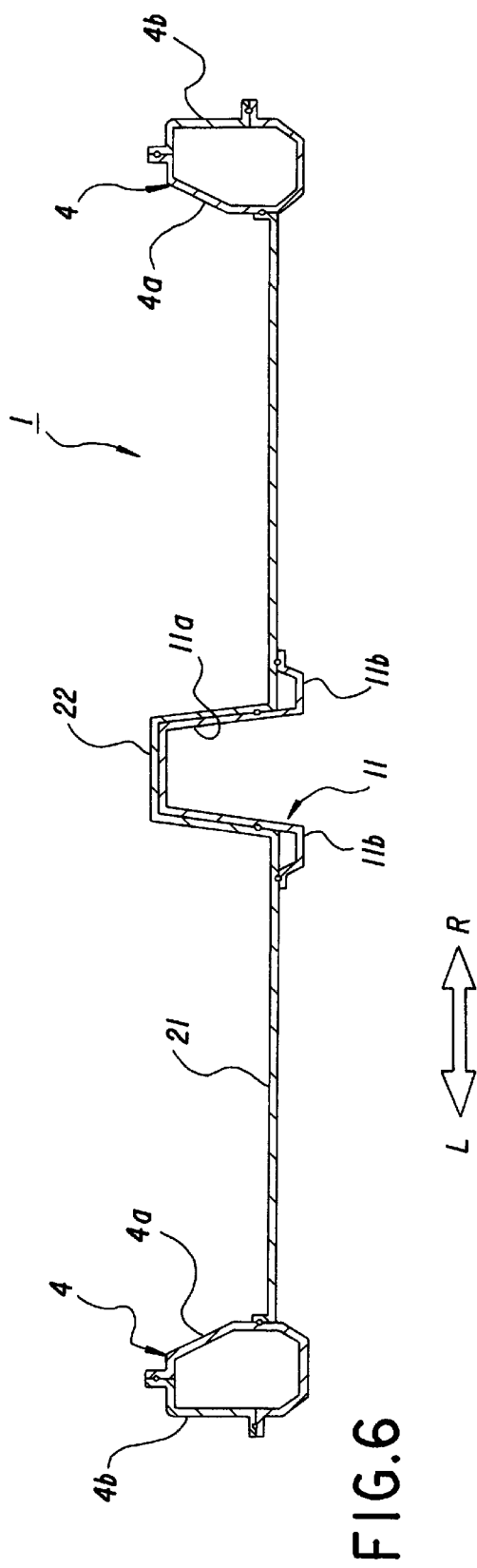
FIG. 6 is an enlarged cross-sectional view taken along line VI—VI of FIG. 5.
Figure 7:
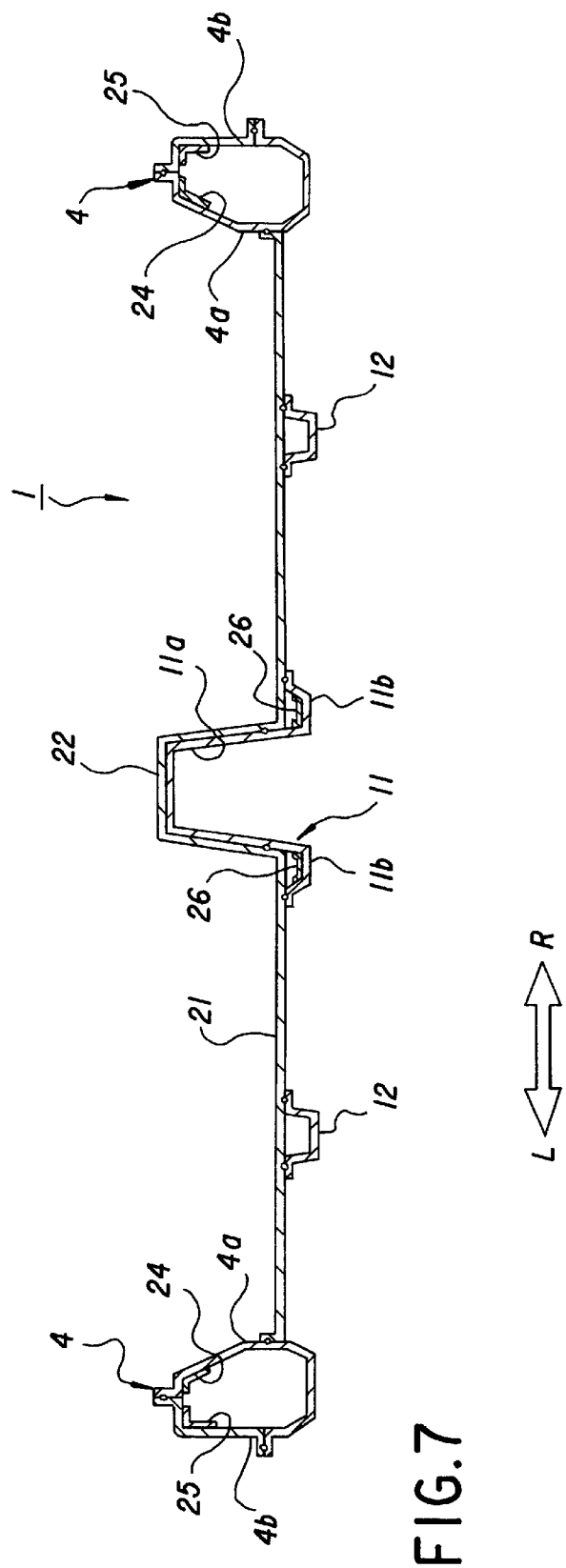
FIG. 7 is an enlarged cross-sectional view taken along line VII—VII of FIG. 5.
Figure 8A:
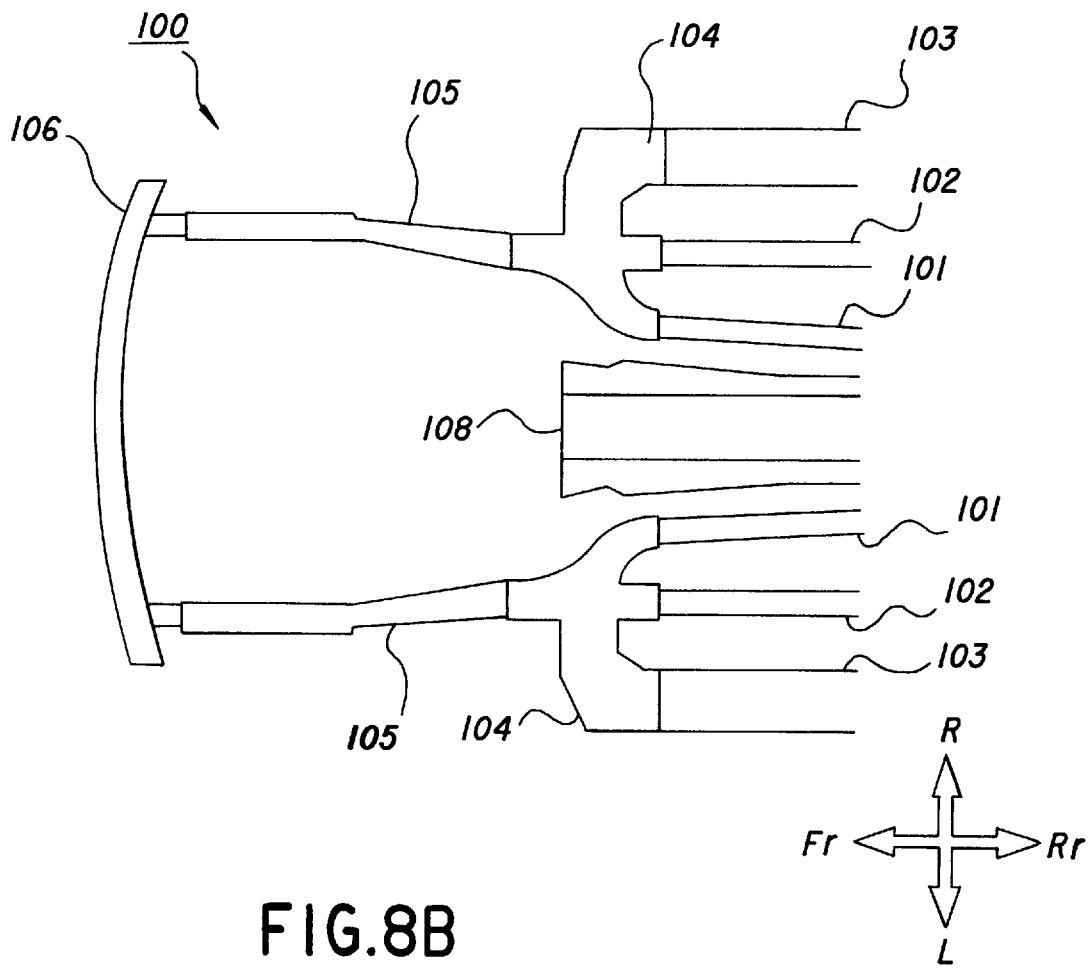
FIGS. 8A and 8B are explanatory views of a conventional vehicle body structure.
Figure 8B:
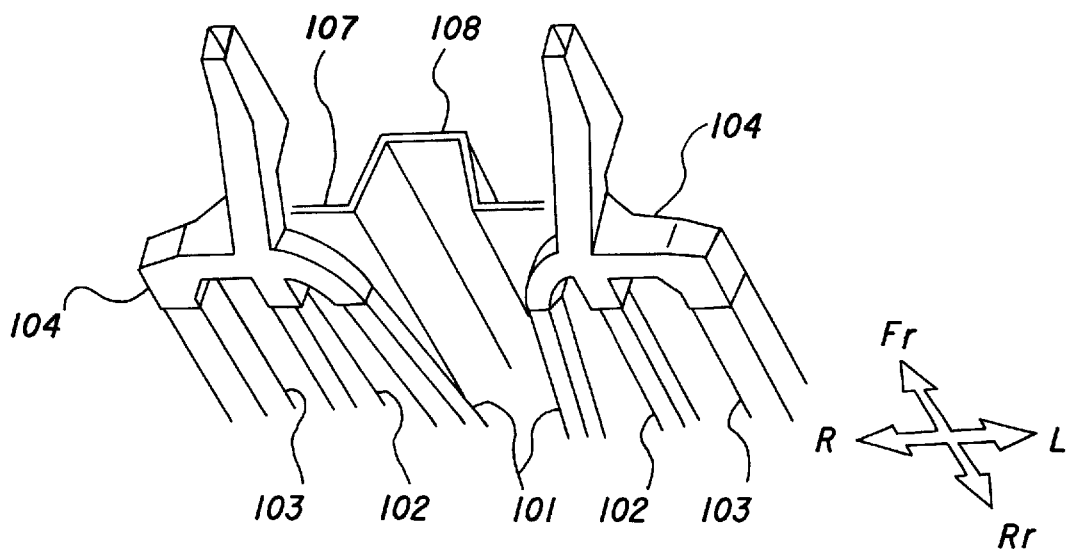

Referring now to FIGS. 5 through 7, there is shown a second embodiment of the present invention. This embodiment has a distinguishable feature that, as shown in FIG. 7, the side sills 4, 4 have an additional reinforcement and the floor frames 11b, 11b are provided with a reinforcement. More specifically, the box-shaped side sills 4, 4 each include a second side sill reinforcing member 25 disposed therein and extending along a longitudinal portion of the side sill 4. The second side sill reinforcing member 25 has a substantially L-shaped cross section and is attached to the other upper interior corner which is spaced farther away from the longitudinal central axis of the vehicle body 1 than the opposite upper interior corner to which the reinforcing member 24 is attached. The upwardly opening generally channel-shaped floor frames 11b, 11b are each provided with a floor frame reinforcing member 26 disposed in the floor frame 11b and extending along a longitudinal portion of the same. The floor frame reinforcing member 26 has a generally channel-shaped cross section and is attached to the interior bottom surf ace of each of the channel-shaped floor frames 11b.

As shown in FIG. 5, the second side sill reinforcing members 25, like the first side sill reinforcing members 24 previously described in conjunction with the first embodiment, have front ends substantially disposed in transverse alignment with the front ends 12a of the auxiliary frames 12 and extend rearwardly from the front ends 12a over the predetermined length $L_2$.

The floor frame reinforcing members 26 have front ends substantially aligned with the front ends 12a of the auxiliary frames 12 in the transverse direction of the vehicle body 1 and extend rearwardly from the front ends 12a over a predetermined length $L_3$ which is substantially the same as the length of the auxiliary frames 12, 12.

According to the vehicle body structure of the second embodiment, the rear section of the vehicle body which is located rearwardly of the front ends 12a of the auxiliary frames 12 are further increased in its rigidity as the second side sill reinforcing members 25 and the floor frame reinforcing members 26 have respective front ends substantially aligned with the front ends 12a of the auxiliary frames 12 in the transverse direction of the vehicle body 1.

In the embodiments described above, the front ends 12a, 12a of the auxiliary frames 12, 12 are spaced rearwardly from the side outriggers 3, 3 by a predetermined distance $L_1$ with the result that a front section of the vehicle body located forwardly of the front ends 12a is less rigid than a rear section of the vehicle body located rearwardly of the front ends 12a. The structure and length of the auxiliary frames 12, 12 should by no means be limited to those in the illustrated embodiments provided that a space is defined between the front ends 12a of the auxiliary frames 12 and the side outriggers 3, 3. For example, the auxiliary frames 12, 12 may either include a rib or bead on a wall of each auxiliary frame 12 to increase the rigidity of the auxiliary frame 12 or have an opening in the wall to decrease the rigidity of the auxiliary frame 12.

Obviously, various minor changes and modifications of the present invention are possible in the light of the above teaching. It is therefore to be understood that within the scope of the appended claims the invention may be practiced otherwise than as specifically described.

What is claimed is:

1. A vehicle body structure comprising:

a pair of floor frames, a pair of auxiliary frames, and a pair of side sills disposed in juxtaposition about a longitudinal central axis of a vehicle body and arranged in the order named in a direction which is both transverse to and outward of said vehicle body; and a pair of front side frames connected via a pair of side outriggers to front ends of said floor frames and front ends of said side sills, respectively, wherein each of said auxiliary frames is disposed between, and spaced laterally from, one of said floor frames and a corresponding one of said side sills, and wherein said auxiliary frames have front ends spaced rearwardly from rear end portions of said side outriggers by a predetermined distance.

2. The vehicle body structure according to claim 1, wherein said side sills are each composed of a box-shaped hollow member and each include a reinforcing member disposed in said box-shaped hollow member along a longitudinal portion thereof, said reinforcing member having a front end substantially aligned with said front ends of said auxiliary frames in said direction of said vehicle body.

3. The vehicle body structure according to claim 2, wherein each of said box-shaped side sills has first and second upper interior corners with said first upper interior corner located closer to said longitudinal central axis of said vehicle body than said second upper interior corner, and said reinforcing member is attached to said first upper interior corner of each box-shaped side sill of said box-shaped side sills.

4. The vehicle body structure according to claim 2, wherein each of said box-shaped side sills has first and second upper interior corners with said first upper interior corner located closer to said longitudinal central axis of said vehicle body than said second upper interior corner, and said reinforcing member is attached to each of said first and second upper interior corners of each box-shaped side sill of said box-shaped side sills.

5. The vehicle body structure according to claim 1, further including a floor panel extending between said side sills, and a floor center frame, wherein said floor panel has an integral floor tunnel frame extending along said longitudinal central axis of said vehicle body and having a recessed inside surface, said floor center frame is attached to said inside surface of said floor tunnel frame to reinforce said floor tunnel frame, and said floor frames are formed integrally with said floor center frame and disposed on opposite sides of said recessed inside surfaces to reinforce said floor panel.

6. The vehicle body structure according to claim 5, wherein said floor frames each have an opening, which faces upwardly and which is of a generally channel-shaped configuration, and each include said reinforcing member attached to an interior bottom surface of said channel-shaped frame.

* * * * *